US012460604B2

(12) United States Patent
Mueller

(10) Patent No.: US 12,460,604 B2
(45) Date of Patent: Nov. 4, 2025

(54) GAS INJECTOR HAVING REDUCED WEAR

(71) Applicant: Robert Bosch GmbH, Stuttgart (DE)

(72) Inventor: Martin Mueller, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 345 days.

(21) Appl. No.: 18/010,844

(22) PCT Filed: Apr. 12, 2021

(86) PCT No.: PCT/EP2021/059438
§ 371 (c)(1),
(2) Date: Dec. 16, 2022

(87) PCT Pub. No.: WO2022/002454
PCT Pub. Date: Jan. 6, 2022

(65) Prior Publication Data
US 2023/0220818 A1 Jul. 13, 2023

(30) Foreign Application Priority Data
Jul. 2, 2020 (DE) ..................... 10 2020 208 273.1

(51) Int. Cl.
*F02M 21/02* (2006.01)
*F02M 61/08* (2006.01)
*F02M 61/12* (2006.01)

(52) U.S. Cl.
CPC .... *F02M 21/0254* (2013.01); *F02M 21/0257* (2013.01); *F02M 61/08* (2013.01);
(Continued)

(58) Field of Classification Search
CPC ........... F02M 21/0254; F02M 21/0257; F02M 21/0269; F02M 2200/707; F02M 2200/16;
(Continued)

(56) References Cited

U.S. PATENT DOCUMENTS

2004/0079815 A1* 4/2004 Hohl .................. F02M 51/0603 239/102.2
2007/0278329 A1* 12/2007 Facchin ................. F02M 61/18 239/533.2
2017/0101966 A1* 4/2017 Filippi ............... F02M 51/0607

FOREIGN PATENT DOCUMENTS

CN 101512140 A 8/2009
DE 19901711 A1 7/2000
(Continued)

OTHER PUBLICATIONS

International Search Report for PCT/EP2021/059438, Issued Jun. 11, 2021.

*Primary Examiner* — Christopher R Dandridge
(74) *Attorney, Agent, or Firm* — NORTON ROSE FULBRIGHT US LLP

(57) ABSTRACT

A gas injector for injecting a gaseous fuel. The gas injector includes a solenoid actuator having an armature, an internal pole and a coil; a closing element, which unblocks and seals a gas path at a valve seat, the armature being connected to the closing element; a sealed lubricant chamber, which is filled with a lubricant, and in which the armature is situated, the lubricant ensuring lubrication of the armature; and a flexible sealing element, which seals the lubricant chamber with respect to the gas path, a damping device being situated in the lubricant chamber.

8 Claims, 4 Drawing Sheets

(52) U.S. Cl.
CPC ......... *F02M 61/12* (2013.01); *F02M 2200/07* (2013.01); *F02M 2200/707* (2013.01)

(58) Field of Classification Search
CPC ......... F02M 2200/21; F02M 2200/304; F02M 51/0603; F02M 51/0671; F02M 63/0026
See application file for complete search history.

(56) References Cited

FOREIGN PATENT DOCUMENTS

| | | | | |
|---|---|---|---|---|
| DE | 102008041544 | A1 * | 3/2010 | ......... F02M 21/0266 |
| DE | 102016205358 | A1 | 10/2017 | |
| EP | 3153693 | A1 | 4/2017 | |
| JP | H05240112 | A | 9/1993 | |
| JP | H09310656 | A | 12/1997 | |

* cited by examiner

GAS INJECTOR HAVING REDUCED WEAR

FIELD

The present invention relates to a gas injector, which is for injecting a gaseous fuel, in particular, hydrogen or natural gas or the like, has reduced wear, and is, in particular, for internal combustion engines. The gas injector is designed, in particular, for direct injection into a combustion chamber of an internal combustion engine.

BACKGROUND INFORMATION

Different embodiments of gas injectors are described in the related art. In principle, one problem area with gas injectors is that due to the gaseous medium to be injected, no lubrication by the medium is possible, as is possible, for example, in fuel injectors that inject gasoline or diesel. During operation, this results in excessive wear in comparison with fuel injectors for liquid fuels. In this connection, it would be desirable to have a gas injector possessing improved wear characteristics.

SUMMARY

A gas injector of the present invention for injecting a gaseous fuel may have an advantage that wear of the gas injector may be reduced significantly. In this manner, a service life of the gas injector is extended and corresponds substantially to a service life of a fuel injector for liquid fuels. According to an example embodiment of the present invention, this may be achieved in that the gas injector includes a lubricant present in a sealed lubricant chamber, in which moving parts of the gas injector are situated. The gas injector includes a solenoid actuator having an armature, an internal pole, and a coil. In this connection, the armature is mechanically connected to a closing element, which unblocks and seals a gas path at a valve seat, in order to enable a movement for opening and/or closing the injector. The armature, which is situated in the lubricant chamber and is drawn towards the internal pole of the solenoid actuator in response to the energizing of the coil, due to electromagnetic forces, is therefore situated in the interior of the lubricant chamber and is continually supplied with lubricant and is lubricated. Due to this, wear to the armature is reduced significantly in comparison with the gas injectors described in the related art. In order to ensure sealing of the lubricant chamber, a flexible sealing element is provided, which seals the lubricant chamber with respect to the closing element at a sub-region. Consequently, the service life of the gas injector may be extended significantly by utilizing the sealed lubricant chamber filled with lubricant. In this context, the lubricant chamber is preferably filled completely with lubricant.

Preferred further refinements of the present invention are disclosed herein.

According to an example embodiment of the present invention, it is also preferable for a damping device to be situated in the lubricant chamber; the damping device being configured to damp the closing element during a resetting operation of the closing element. This allows wear to be reduced at the valve seat, since an impact of the closing element at the seat of the valve body may be reduced by decelerating the closing element during the resetting operation. The damping device may reduce the impulse during the impingement of the closing element upon the valve seat, in particular, since the valve seat is usually very dry and is situated in the hot atmosphere of the combustion chamber.

According to an example embodiment of the present invention, the damping device preferably includes a damping pin and an elastic damping element, such as a spring or an elastic component. During the resetting operation, the damping pin may be brought into operative connection with the armature and/or the closing element, so that prior to its actual impact on the limit stop, the armature strikes the damping pin and moves it in opposition to the force of the elastic element, which renders damping of the armature possible during the resetting operation. In particular, a restoring speed of the armature is reduced. This is also assisted by the acceleration of the additional masses provided by the damping device. Further damping is produced by the displacement of the lubricant between the armature and the damping pin. A resetting speed of the closing element may also be reduced further by the friction of guide elements or the like with the damping pin. This all reduces the impact force of the armature on the limit stop, which means that a service life of the armature may be extended further.

According to an example embodiment of the present invention, it is particularly preferable for a damping guide element to be positioned at the damping pin; the damping guide element ensuring stable movement of the guide pin. In addition, the damping guide element may also generate friction during the resetting operation of the closing element, which provides an additional damping function.

In the closed state of the injector, an axial gap B between the damping guide element and the damping pin is preferably smaller than an axial gap C between the armature and the internal pole. In this context, axial gap B between the damping guide element and the damping pin is in a range of 1% to 90% of axial gap C between the armature and the internal pole. In this context, it is particularly preferable for axial gap B between the damping guide element and the damping pin to be less than 25% of axial gap C, and further preferable for it to be in a range of 3% to 10% of axial gap C. Axial gap C preferably has a dimension of 0.05 mm to 3 mm, in particular, 0.3 mm.

An oil, in particular, mineral oil, is preferably used as a lubricant. Alternatively, a liquid fuel, in particular, diesel or gasoline, is used. As a further alternative, a grease is used as a lubricant.

According to an example embodiment of the present invention, it is further preferable for the flexible sealing element to be a single-layer or multilayer bellows. The bellows is preferably made of metal or alternatively made of plastic. Preferably, a first end of the bellows is fixed directly to the closing element, and another end of the bellows is fixed to a housing part of the gas injector. In the case of metal bellows, the fixation may be accomplished, for example, with the aid of a welded seam.

The flexible sealing element is alternatively a diaphragm. The diaphragm may be single-layer or multilayer and may be fixed to the respective components, for example, with the aid of laser welding, in order to seal the lubricant chamber.

According to an example embodiment of the present invention, a gas path of the gaseous fuel is preferably provided in a region between a valve housing of the gas injector and an actuator housing of the gas injector. This allows the actuator to be situated in a housing and to be preassembled at least partially as a module. In this manner, the lubricant chamber may also be situated in the interior of the actuator housing in a relatively simple manner.

Alternatively, the gas path of the gaseous fuel is formed by a region of the solenoid actuator, in particular, by the coil space, in which the coil of the solenoid actuator is situated. This may eliminate the need for a separate actuator housing for the solenoid actuator. Then, it is particularly preferable for electrical contacting to be run through the gas path of the gaseous fuel. In this manner, in particular, a complexity of the construction of the gas injector may be reduced. It should be pointed out that, of course, the electrical contacting, which runs through the gas space, must be sealed in the direction of the outside.

It is further preferable for a filter for the gaseous fuel to be positioned in the gas path, in order to filter out particulate solids possibly present in the gaseous fuel, or in order to filter out particulate solids caused by manufacturing or assembly. It is further preferable for a guide part to be provided on the closing element, as well, in particular, if the closing element is a long valve needle.

According to an example embodiment of the present invention, the gas injector is preferably an injector that opens outwards. It is further preferable for the gas injector to be pressure-balanced. This allows the force by the solenoid actuator to open the gas injector to be independent of the gas pressure. Consequently, the time for opening and closing the injector after the start of flow and the end of flow, respectively, is also independent of the gas pressure. This, in turn, permits operation at different gas pressures. The gas pressure may be reduced in the case of a low desired injection quantity, and the gas pressure may be increased in the case of a high injection quantity. The injector is pressure-balanced, when the mean diameter of the bellows is equal to the diameter of the line of seating contact between the closing element and the valve body. However, the mean bellows diameter may also be designed to be less than or greater than the seat diameter. In the first case, in the event of a higher gas pressure, the total closing force on the valve needle decreases, and the injector opens more rapidly during the flow and closes more slowly after the flow. This results in a higher quantity of gas injected. In the second case, the closing force on the valve needle increases in response to a higher gas pressure. An increase in the quantity leaked at the seat may be compensated for, in turn, by the higher gas pressure.

According to an example embodiment of the present invention, resetting is preferably accomplished with the aid of a restoring spring. In the case of a pressure-balanced injector, in the closed state of the gas injector, there is, in particular, no pressure force on the valve needle from the gaseous fuel, which means that a loading of the closing element may be reduced significantly.

BRIEF DESCRIPTION OF THE DRAWINGS

In the following, exemplary embodiments of the present invention are described in detail with reference to the figures.

DETAILED DESCRIPTION OF EXAMPLE EMBODIMENTS

In the following, a gas injector 1 according to a first preferred exemplary embodiment of the present invention is described in detail with reference to FIGS. 1 through 3.

Figure 1:
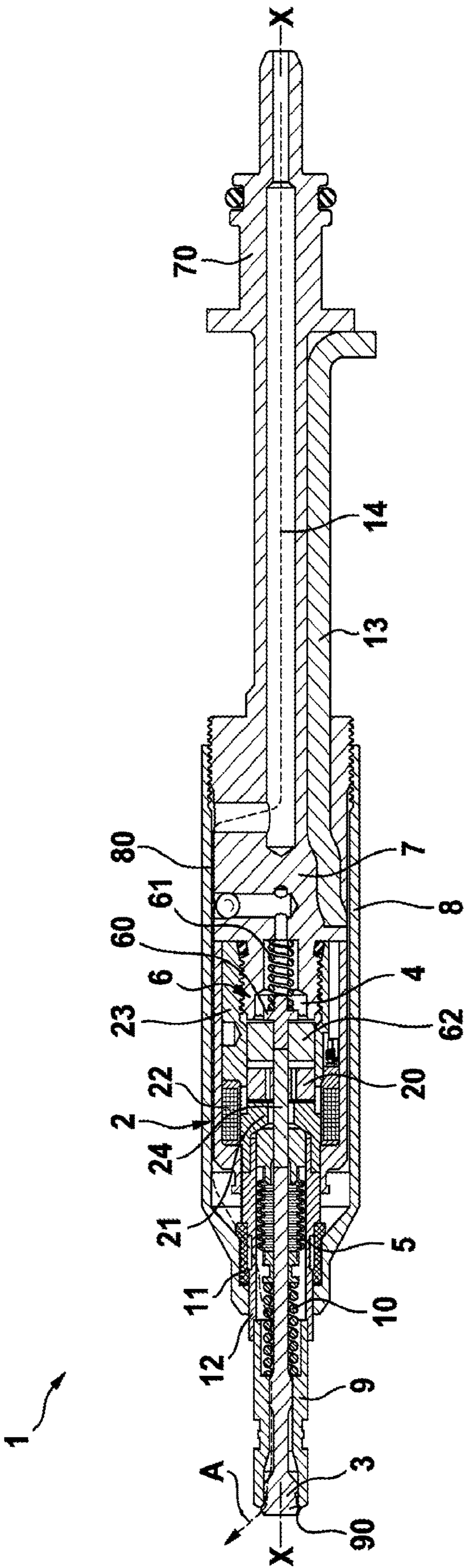
FIG. 1 shows a schematic sectional view of a gas injector according to a first exemplary embodiment of the present invention.

As is apparent from FIG. 1, in order to introduce a gaseous fuel, gas injector 1 includes a solenoid actuator 2, which moves a closing element 3 from a closed state into an open state; in this exemplary embodiment, the closing element being a valve needle opening outwards. In this context, FIGS. 1 through 3 show the closed state of the gas injector.

Solenoid actuator 2 includes an armature 20, which abuts closing element 3 with the aid of an armature pin 24. In addition, solenoid actuator 2 includes an internal pole 21, a coil 22 and a solenoid housing 23, which secures a magnetic yoke of the solenoid actuator.

Furthermore, gas injector 1 includes a main member 7 having a connecting pipe 70, through which the gaseous fuel is fed. In this context, a valve housing 8, in which solenoid actuator 2 is situated, is fixed to main member 7. Valve housing 8 is followed by a valve body 9, at whose free end a valve seat 90 is provided, in which closing element 3 unblocks and seals a passage for the gaseous fuel.

Figure 2:
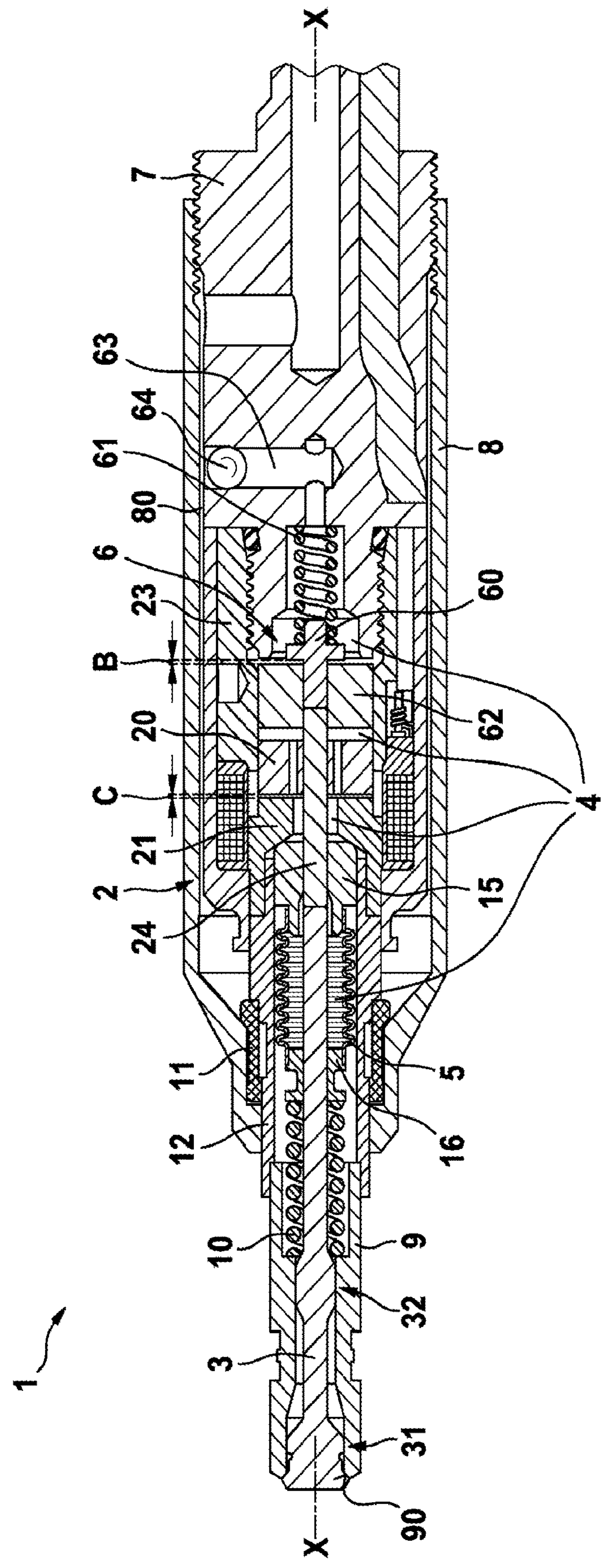
FIG. 2 shows a schematic, enlarged part-sectional view of the gas injector of FIG. 1.
Figure 3:
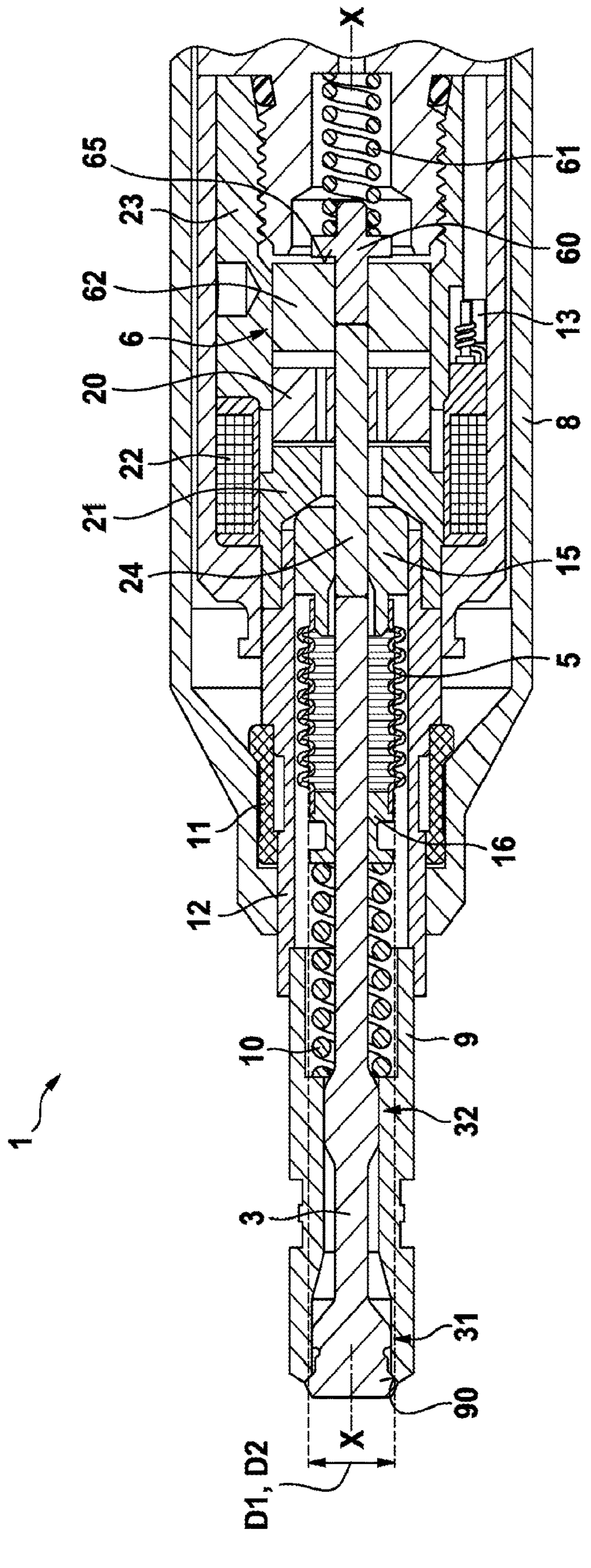
FIG. 3 shows a further schematic, enlarged part-sectional view of the gas injector of FIG. 1.

An electrical terminal 13, which is run through main member 7 to solenoid actuator 2, is represented schematically in FIGS. 1 through 3.

A retaining member 12 is provided, in order to fix internal pole 21 to valve body 9.

Reference numeral 10 denotes a restoring element for closing element 3, for moving it back again into the closed state shown in FIG. 1, after an opening operation.

In addition, a gas stream in the form of a gas path 14 through gas injector 1 is represented in FIG. 1. In this context, the gas stream begins at the connecting pipe and is then rerouted by 90° into an annular space 80 between valve housing 8 and main member 7. In this case, gas stream 14 goes further past an outer region of solenoid actuator 2, through a filter 11 in the region at closing element 3, to valve seat 90. Accordingly, in this connection, openings, which are not shown in the figures, are provided in the specific components.

Then, upon the opening of gas injector 1, the gaseous fuel flows past the periphery of solenoid actuator 2 and past open sealing seat 90 into a combustion chamber of an internal combustion engine, which is indicated in FIG. 1 by arrow A.

Thus, closing element 3 unblocks a gas path at valve seat 90 and seals it. For guidance, a first guide region 31 and a second guide region 32 are between closing element 3 and valve body 9, as is apparent in the detail from FIG. 2.

In addition, gas injector 1 includes a sealed lubricant chamber 4. Lubricant chamber 4 may be seen in the detail from FIGS. 2 and 3. Sealed lubricant chamber 4 is filled completely or partially with a lubricant.

As is apparent from FIG. 2, lubricant chamber 4 is bounded by main member 7, solenoid housing 23, internal pole 21, and a flexible sealing element 5 in the form of a bellows. In this context, flexible sealing element 5 provides sealing at closing element 3. Consequently, a first end of flexible sealing element 5 is fixed in position at a spring collar 16, which supports a restoring element 10 for closing element 3, and a second end of the flexible sealing element is fixed in position at a sleeve-shaped ring 15. In this context, flexible sealing element 5 compensates for the movement of closing element 3 occurring in axial direction X-X of the injector.

As may be seen in detail from FIGS. 2 and 3, the armature pin 24 having armature 20 fixed to it is situated in sealed lubricant chamber 4. Since lubricant chamber 4 is filled with a lubricant, for example, a liquid fuel such as gasoline or diesel, or a grease or the like, armature 20 is lubricated continuously. In this manner, the problem of missing lubrication of the moving parts, which occurs in the related art in the case of gaseous fuels, may be compensated for.

As is apparent from FIG. 2, a filling duct 63 for filling the sealed lubricant chamber 4 is formed in main member 7. Filling duct 63 is sealed in a fluid-tight manner with the aid of a sealing ball 64.

In addition, a damping device 6 is situated in sealed lubricant chamber 4. Damping device 6 includes a damping pin 60, a damping spring 61, and a damping guide element 62. Damping guide element 62 is used for guiding damping pin 60 and is situated at an inner circumference of solenoid housing 23 (cf. FIGS. 2 and 3).

In this context, damping pin 60 is operatively connected to the armature via armature pin 24.

In this case, damping device 6 has the task of decelerating closing element 3, together with armature 20, during a closing operation of gas injector 1. In this context, the damping is accomplished, on one hand, by the damping spring force from damping spring 61 at damping pin 60, as well as by hydraulic adhesion at an axial contact surface 65 between damping pin 60 and stationary damping guide element 62 (cf. FIG. 3) upon lift-off of damping pin 60 from axial contact surface 65.

During the resetting of closing element 3, it is additionally decelerated by the friction in damping guide element 62, into which part of armature pin 24 also projects. Furthermore, the masses to be accelerated and the displacement of the lubricant in sealed lubricant chamber 4 result in additional damping during the closing operation.

In the closed state, an axial gap C is provided between armature 20 and internal pole 21, as is apparent from FIG. 2. An axial gap B is provided between damping pin 60 and damping guide element 62. Axial gap C between armature 20 and internal pole 21 is preferably in a range of 0.05 to 3 mm and is, particularly preferably, 0.2 to 0.5 mm. When there is flow through coil 22, armature 20 is then drawn towards internal pole 21, through which closing element 3 in brought into the open state via armature pin 24, which allows gaseous fuel to flow out into the combustion chamber. It should be pointed out that, in order to reduce magnetic leakage flux, in particular, armature pin 24 and/or sleeve-shaped ring 15 are made of non-magnetizable materials.

In this context, axial gap B between damping pin 60 and damping guide element 62 is smaller than gap C between armature 20 and internal pole 21, and during the opening operation, it is closed by the spring force of damping spring 61, as well. Gap B is preferably 1% to 90% of gap C. During the resetting operation, this produces the hydraulic adhesion of damping pin 60 to damping guide element 62.

With that, the gas injector 1 shown in FIGS. 1 through 3 is pressure-balanced. This means that closing element 3 is connected to flexible sealing element 5 via spring collar 16; the flexible sealing element 5 implemented as a metal bellows having a mean diameter D1, which is equal to a diameter D2 on valve seat 90, at which closing element 3 produces a seal on valve body 9. Due to this, there is no pressure force on closing element 3, which means that a magnetic force, which is necessary to open closing element 3, may be kept quite small and is, in particular, independent of a pressure of the gaseous fuel.

It is noted that instead of the bellows, e.g., a diaphragm or a tube or the like may also be used as a flexible sealing element 5.

Consequently, gas injector 1 may generate decreased wear on the moving parts, in particular, on valve seat 90, armature 20, and in armature pin 24. In addition, heat conduction through sealed lubricant chamber 4 out of solenoid actuator 2 may be improved markedly, using a liquid lubricant.

Figure 4:
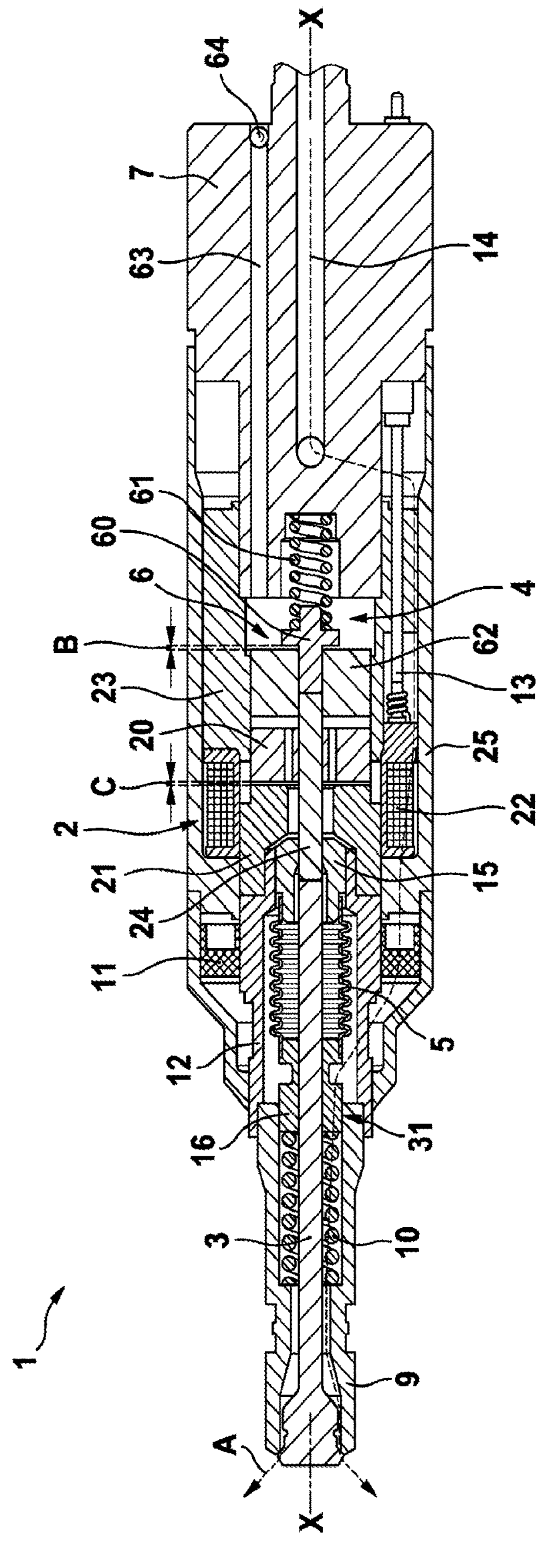
FIG. 4 shows a schematic part-sectional view of a gas injector according to a second exemplary embodiment of the present invention.

FIG. 4 shows a gas injector 1 according to a second exemplary embodiment of the present invention. The same or functionally equivalent parts are designated as in the first exemplary embodiment.

As is apparent from FIG. 4, the construction of gas injector 1 is fundamentally the same as that of the first exemplary embodiment. However, in contrast to it, a gas path 14 is routed differently in the region of solenoid actuator 2. In this connection, the gas path 14 in the second exemplary embodiment goes through the coil space at the solenoid actuator 2, in which coil 22 is situated. In this instance, gas path 14 leads through openings in pot magnet 25. Due to this, a valve housing may be dispensed with. In this context, the electrical terminal 13 in the form of a contact pin is insulated from main member 7. In addition, a first guide region 31 of closing element 3 is provided at a circumference of spring collar 16. Accordingly, spring collar 16 includes, in this context, transit openings for gas path 14. Lubricant chamber 4 is encapsulated in accordance with the first exemplary embodiment and provides lubrication to armature 20 during opening and closing operations of gas injector 1.

In all other respects, this exemplary embodiment corresponds to the first exemplary embodiment, so that reference is made to the description supplied there.

What is claimed is:

1. A gas injector for injecting a gaseous fuel, comprising:
- a solenoid actuator having an armature, an internal pole, and a coil;
- a closing element, which unblocks and seals a gas path at a valve seat, the armature being connected to the closing element;
- a sealed lubricant chamber, which is filled with a lubricant, and in which the armature is situated, the lubricant ensuring lubrication of the armature; and
- a flexible sealing element, which seals the lubricant chamber with respect to the gas path,
- a damping device configured to decelerate the closing element during a resetting operation of the gas injector from an open into a closed state, and situated in the lubricant chamber,
- wherein the damping device includes a damping pin and an elastic damping element; and, the damping pin and the elastic damping element are configured to be brought into operative connection with the closing element and/or the armature, during the resetting operation.

2. The gas injector as recited in claim 1, wherein the damping pin is guided in a damping guide element in the lubricant chamber.

3. The gas injector as recited in claim 2, wherein in the closed state of the injector, a first axial gap between the damping guide element and the damping pin is smaller than a second axial gap between the armature and the internal pole.

4. The gas injector as recited in claim 1, wherein the sealed lubricant chamber is filled completely or partially with lubricant, the lubricant including oil or gasoline or diesel, or grease.

5. The gas injector as recited in claim 1, wherein the flexible sealing element is a bellows, the bellows being a metal bellows or a diaphragm.

6. The gas injector as recited in claim 1, wherein:

a gas path for the gaseous fuel runs in a region between a valve housing and a solenoid housing of the solenoid actuator; or the gas path of the gaseous fuel runs through a region of the solenoid actuator in which the coil is situated.

7. The gas injector as recited in claim 1, wherein the gas injector is an injector that opens outwards.

8. The gas injector as recited in claim 1, wherein a mean diameter of the flexible sealing element is equal to a diameter of the valve seat on the valve body, at which the closing element unblocks and seals the gas path.

* * * * *